United States Patent [19]

Hibbs, Jr. et al.

[11] 4,054,837
[45] Oct. 18, 1977

[54] BIDIRECTIONAL RADIO FREQUENCY AMPLIFIER WITH RECEIVER PROTECTION

[76] Inventors: Eugene B. Hibbs, Jr., 1206 Fernside Drive, La Canada, Calif. 91011; Michael J. Derem, 7777 Hollywood Blvd., Hollywood, Calif. 90046

[21] Appl. No.: 710,595

[22] Filed: Aug. 2, 1976

[51] Int. Cl.² ............................................. H04B 1/40
[52] U.S. Cl. ...................................... 325/21; 325/22; 325/25; 343/180
[58] Field of Search ........................... 325/21, 22, 25; 343/176, 180; 307/311; 333/13

[56] References Cited

U.S. PATENT DOCUMENTS

| | | |
|---|---|---|
| 3,117,241 | 1/1964 | Paynter .................................. 325/21 |
| 3,327,215 | 6/1967 | Battin .................................... 325/21 |
| 3,835,384 | 9/1974 | Liff ....................................... 325/25 |
| 3,858,063 | 12/1974 | Saleme ................................. 307/311 |

Primary Examiner—Benedict V. Safourek
Assistant Examiner—Michael A. Masinick
Attorney, Agent, or Firm—Blakely, Sokoloff, Taylor & Zafman

[57] ABSTRACT

A bidirectional radio frequency amplifier which includes a power amplifier and a receiver amplifier connected to a common antenna. A pair of parallel diodes coupled across the input of the receiver amplifier provides a high impedance path for a received signal and a low impedance path during transmission thereby eliminating the need for mechanical or semiconductor switching.

8 Claims, 2 Drawing Figures

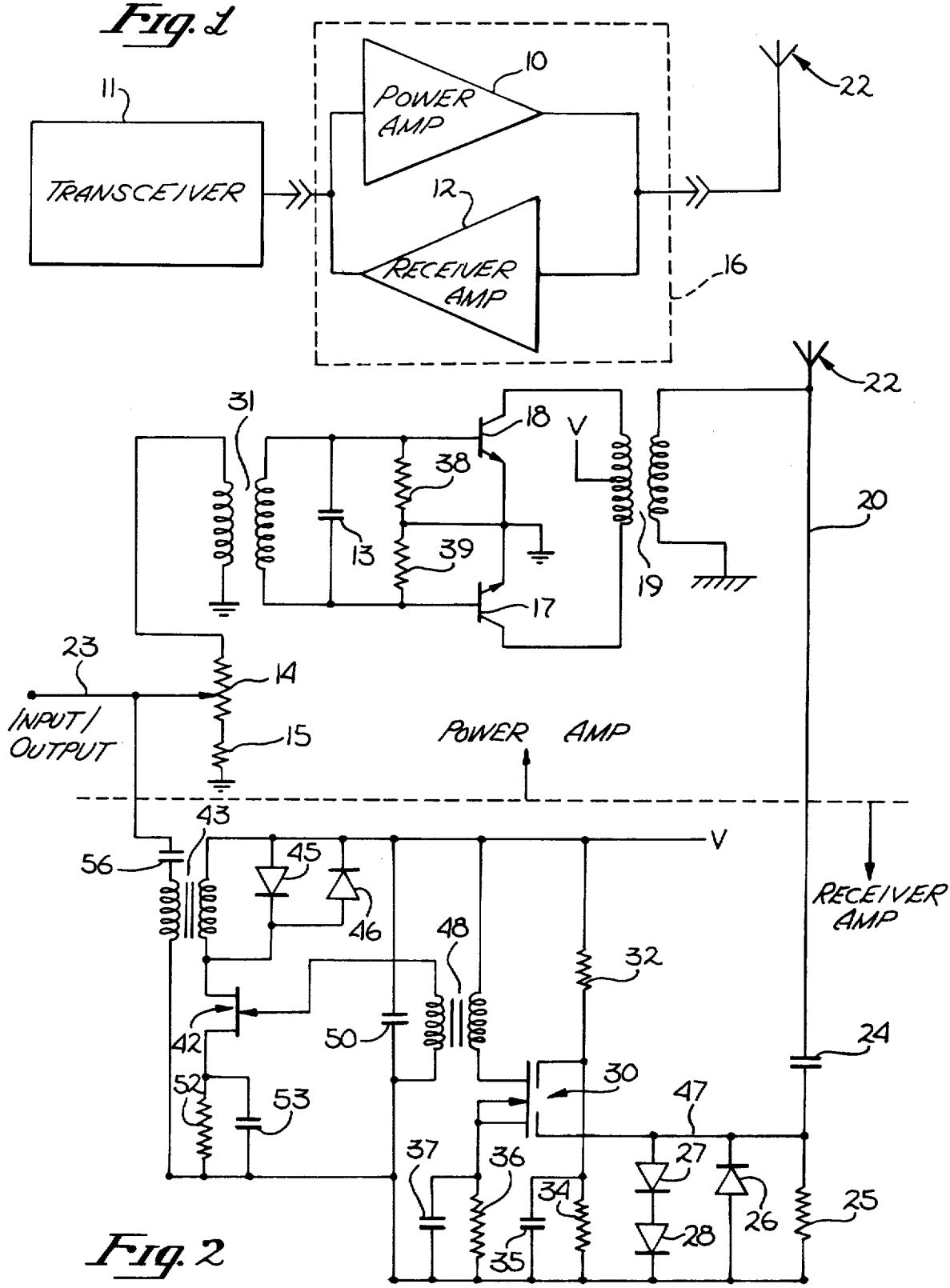

4,054,837

BIDIRECTIONAL RADIO FREQUENCY AMPLIFIER WITH RECEIVER PROTECTION

BACKGROUND OF THE INVENTION

1. Field of the Invention

The invention relates to the field of radio frequency amplifiers, particularly those which are bidirectional or bilinear.

2. Prior Art

Radio frequency transceivers often employ manually operated means for switching between transmitting and receiving modes. Such switching is used to prevent the high power output of the transceiver from being coupled into the receiver, in addition to other uses.

In applications where a bidirectional power amplifier is employed in the antenna line of the transceiver additional complexity is required to couple the transmit/receive switching signal from the manually operated button to the bidirectional amplifier. This additional complexity is particularly troublesome where the transceiver is remotely located from the antenna. In this situation a bidirectional amplifier (for amplifying both the transmitted signal and received signal) may be located close to the antenna to amplify the small received signal before it is attenuated in the long line between the transceiver and antenna. Also by amplifying the transmitted signal at the antenna, power loss in the long lines is reduced.

In the prior art, the transmit/receive switching has been done automatically with a relay, or the like. A portion of the transmitted carrier signal is rectified and used to operate the relay. When the carrier signal is not present, the relay automatically switches the antenna to the receiver. One problem with this technique is that there is a switching time dalay and moreover, large signals received by the antenna (which could damage the receiver) are coupled to the receiver. As will be seen, the present invention solves this problem in a unique and simple manner, without the use of relays, and without the need to rectify the transmitted signal.

SUMMARY OF THE INVENTION

A radio frequency bidirectional amplifier for amplifying a transmission signal and a received signal and which is coupled to a common antenna is described. The common antenna line is capacitively coupled to the input of a receiver amplifier with a pair of parallel diodes coupled at this input. These diodes provide a low resistance path to the transmitted signal since the transmitted signal is large enough to cause the diodes to conduct. This conduction prevents the large transmitted signal from being coupled into the input of the receiver amplifier. The diodes, however, do not conduct in the presence of the small received signal, allowing the signal to be sensed and amplified. Thus, the diodes not only provide protection against the large transmitted signal but also protect the receiver amplifier from any large signals received by the antenna.

BRIEF DESCRIPTION OF THE DRAWINGS

FIG. 1 is a block diagram of a transceiver, bidirectional amplifier and antenna, and FIG. 2 is a schematic of a bidirectional amplifier and in particular illustrates the presently preferred embodiment of the receiver amplifier and its protection means.

DETAILED DESCRIPTION OF THE INVENTION

A bidirectional amplifier is described which includes protection means for protecting the receiver amplifier from the transmitted signal. While the presently preferred embodiment of the receiver is described in detail, variations of the circuit employing the invented principle will be obvious to those skilled in the art.

Referring first to FIG. 1 a bidirectional amplifier is illustrated within the dotted line 16. This amplifier includes a power amplifier 10 which is connected between a transceiver 11 and an antenna 12. A receiver amplifier 12 is included within the bidirectional amplifier 16 thereby providing the bidirectional feature. This amplifier is also coupled between the antenna 22 and the receiver 11, with the input of the receiver amplifier 12 coupled to receive small signals from the antenna 22. It is apparent from FIG. 1 that signals amplified by the power amplifier 10 are coupled directly into the input of the receiver amplifier 12, and thus means must be provided to prevent the large output signal of the power amplifier 10 from damaging the receiver amplifier 12.

Referring now to FIG. 2 the transmission portion of the bidirectional amplifier 16 is shown above the dotted line and the receiver portion is illustrated generally below the dotted line. The bidirectional amplifier includes a single input/output terminal 23 which is coupled to the transceiver, and a single output/input terminal 20 which is coupled to the antenna 22. The described principle, as will be appreciated, may be employed over a wide range of frequencies; in its present realization the amplifier is a broadband amplifier operating between the frequencies of 7 and 30 mhz. The input to terminal 23 from transceiver 11 consists of a relatively large input signal in the order of magnitude of one watt or more.

In FIG. 2 a single stage of power amplification is illustrated which includes transistors 17 and 18 operating in a modified Class B mode. Other power amplifiers, well-known in the art, may be employed including those utilizing Class B or Class C operation. As shown in FIG. 2 terminal 23 is coupled to the wiper of a carbon potentiometer 14. One terminal of potentiometer 14 is coupled to ground through a resistor 15. The other terminal of potentiometer 14 is coupled to the primary of a transformer 31. The secondary leads of the radio frequency transformer 31 is coupled to the base terminals of the power transistors 17 and 18. Series resistors 38 and 39 and capacitor 13 are also coupled across the secondary winding of transformer 31. The common junction between resistors 38 and 39, and the emitter terminals of transistors 17 and 18 are coupled to ground. The primary winding of transformer 19 is coupled to the collectors of transistors 17 and 18; the center tap of this winding is coupled to a source of positive potential. The secondary winding of transformer 19 is coupled to antenna 22 through terminal 20 and to the antenna ground which may be common with the amplifier ground. Feedback lines, well-known in the-art are not shown in FIG. 2.

In operation transistors 17 and 18 are normally biased off. When the signal applied by transformer 13 reaches a predetermined level, biasing is provided by the resistors 38 and 39.

The input to the receiver amplifier, line 47 of FIG. 2, is capacitively coupled through capacitor 24 to the terminal 20. This input line is coupled to ground through resistor 25 and through the parallel combination of diodes 26 and 27 (ignoring for a moment, diode 28). Diode 26 is coupled between ground and line 47 such that it conducts current from ground to line 47, while diode 27 is coupled such that it will conduct current from line 47 to ground. A light emitting diode 28 is coupled in series with the diode 27. This diode, as will be described, is employed to give a visual indication of transmission.

The receiver amplifier includes a dual gate, field-effect, n-channel transistor 30. One gate of this transistor is coupled to the input line 47. The other gate of transistor 30 is coupled to a positive potential through resistor 32 and to ground through the parallel combination of resistor 34 and capacitor 35. The drain terminal of transistor 30 is coupled to the positive potential through the primary winding of a radio frequency transformer 48. The substrate and source terminal of transistor 30 are coupled to ground through the parallel combination of resistor 37 and capacitor 36. One terminal of the secondary winding of transformer 48 is coupled to ground, and to the positive potential through the capacitor 50. The other terminal of this winding is coupled to the base of a junction transistor 42. One terminal of this junction transistor is coupled to ground through the parallel combination of resistor 52 and capacitor 53. The other terminal of the junction transistor 42 is coupled to the positive potential through the secondary winding (the winding with the greater number of turns) of a radio frequency transformer 43. A pair of parallel diodes 44 and 46, which provide clipping, are coupled across the secondary winding of transformer 43. One terminal of the primary winding of transformer 43 is coupled to ground while the other terminal is coupled to terminal 23 through the capacitor 56.

The circuit of FIG. 2 may be fabricated from ordinary, commercially available components.

Assume for sake of discussion that transceiver 11 is transmitting, and thus is providing a signal to terminal 23. This signal is coupled to the bases of transistors 17 and 18 through the transformer 31 and is amplified by these power transistors. The signal from the transceiver is large enough to cause the transistor to conduct. The amplified signal from transformer 19 is coupled to the antenna 22 in an ordinary manner. This transmitted signal is also coupled to the input of the receiver amplifier, line 47 through capacitor 24. The signal present on line 47 is large enough to cause diodes 26 and 27 to conduct, thus line 47 is maintained at a relatively low potential, for example, 0.7 V for silicon diodes. The impedance presented by capacitor 24 is sufficiently large to prevent loading of the antenna by the low impedance path provided by the diodes 26 and 27. Thus, during transmission the diodes 26 and 27 provide a relatively low impedance path at the input to the receiver amplifier and thereby prevent large signals from being coupled into this amplifier.

During transmission the flow of current through diodes 27 and 28 is sufficiently large to cause diode 28 to emit visible light. In the presently preferred embodiment the diode 28 is mounted on the front panel of the amplifier and thus provides a visual indication of transmission.

During transmission even though the diodes 26 and 27 prevent the presences of large signals on line 47, nonetheless a signal is present. This signal is amplified by transistors 30 and 42 and coupled to the transformer 43. However the diodes 45 and 46 act as clippers and limit the amplitude of the output signal from the receiver amplifier. Moreover, the receiver amplifier is coupled such that its output at capacitor 56 is approximately 180° out-of-phase with the input signal, thus providing negative feedback. As mentioned, the output from the transceiver is relatively large when compared to the output of the receiver amplifier, therefore any distortion introduced by clipping is not significant.

Assume now that the transceiver 11 is not transmitting and that the antenna 22 is receiving a typical (small) signal. This signal is coupled through capacitor 24 to the input line 47 of the receiver amplifier. Since this signal is relatively small it is not sufficient in magnitude to cause diodes 26 or 27 to conduct. Thus these diodes present a relatively high resistance and allow the receive signal to be applied to a gate of transistor 30. This signal is amplified by transistors 30 and 42 and coupled to terminal 23. The amplification by these transistors for the received signal is not sufficient to cause the diodes 45 and 46 to clip the waveform. The amplified signal provided by the receiver amplifier during this non-transmission period is not amplified by the power amplifier since the amplitude of the output of the receiver amplifier is not sufficient to cause conduction in the transistors 17 and 18. As mentioned, these transistors operate in a modified, Class B mode with neither transistor conducting until a predetermined amplitude is reached at their bases. In this regard it should be noted that in transformer 43 the winding with the greater number of turns is coupled to the transistor 42 rather than at the output of the amplifier. Also while diodes are employed at the input of the receiver amplifier in the presently preferred embodiment other semiconductor devices may likewise be employed for this application.

The circuit of FIG. 2 also provides automatic protection to the receiver amplifier if a large signal is received by the antenna. In this case diodes 26 and 27 will conduct protecting the input to the receiver amplifier. This protecting is not obtainable with the prior art relay system used for transmit/receive switching.

Thus a bidirectional amplifier has been described which includes a power amplifier and a receive amplifier. A single input/output line may be employed to couple the bidirectional amplifier with a transceiver and a single output/input line is employed to couple the amplifier with an antenna. Automatic protection of the receiver amplifier is obtained.

We claim:

1. A radio frequency amplifier for transmitting and receiving a radio frequency signal on a common line, including a common input/output terminal for communicating with a transceiver and a circuit for enabling a receiver amplifier to be coupled to said common line comprising:

a pair of parallel diodes coupled to said common line such that said diodes provide a low impedance path to a transmitted signal on said common line, and a high impedance to a received signal on said common line;

the output of said receiver amplifier coupled to said input/output terminal, said receiver amplifier providing an amplified output signal at said terminal which is approximately 180° out-of-phase with said transmitted signal so that said receiver amplifier output signal provides negative feedback to the input of said radio frequency amplifier;

whereby said parallel diodes prevent a large transmitted signal from being fully coupled into said receiver amplifier, and said receiver amplifier provides negative feedback to said radio frequency amplifier input.

2. The radio frequency amplifier defined by claim 1 wherein said receiver amplifier includes clipping means for limiting the amplitude of the output signal from said receiver amplifier.

3. The radio frequency amplifier defined by claim 1 wherein said pair of diodes are capacitively coupled to said output terminal.

4. The radio frequency amplifier defined by claim 3 including a light emitting diode coupled in series with one of said pair of diodes to provide a visual indication of said amplified radio frequency output signal.

5. A bidirectional radio frequency amplifier for coupling between a transceiver and an antenna comprising:
 a first terminal for coupling with said transceiver;
 a second terminal for coupling with said antenna;
 a radio frequency power amplifier for amplifying a signal from said transceiver, said power amplifier having an input coupled to said first terminal and an output coupled to said second terminal;
 a receiver amplifier for amplifying a signal received by said antenna, and providing a receiver amplifier output which is approximately 180° out-of-phase with its input signal, said receiver amplifier having an input coupled to said second terminal and an output coupled to said first terminal;
 semiconductor means for providing a low impedance path for a signal amplified by said power amplifier and for providing a high impedance to said signal received by said antenna, said semiconductor means coupled to said input of said receiver amplifier;
 whereby said power amplifier output is prevented from damaging said receiver amplifier and said receiver amplifier provides negative feedback to said power amplifier input for preventing damage to said power amplifier.

6. The radio frequency amplifier defined by claim 5 wherein said semiconductor means comprises a pair of parallel diodes.

7. The radio frequency amplifier defined by claim 6 wherein said power amplifier is biased off when said signal from said transceiver is not present.

8. The radio frequency amplifier defined by claim 7 wherein said receiver amplifier is capacitively coupled to said second terminal.

* * * * *